Oct. 10, 1933.  H. E. TAUTZ  1,930,022
CHUCK
Filed May 21, 1932  2 Sheets-Sheet 1
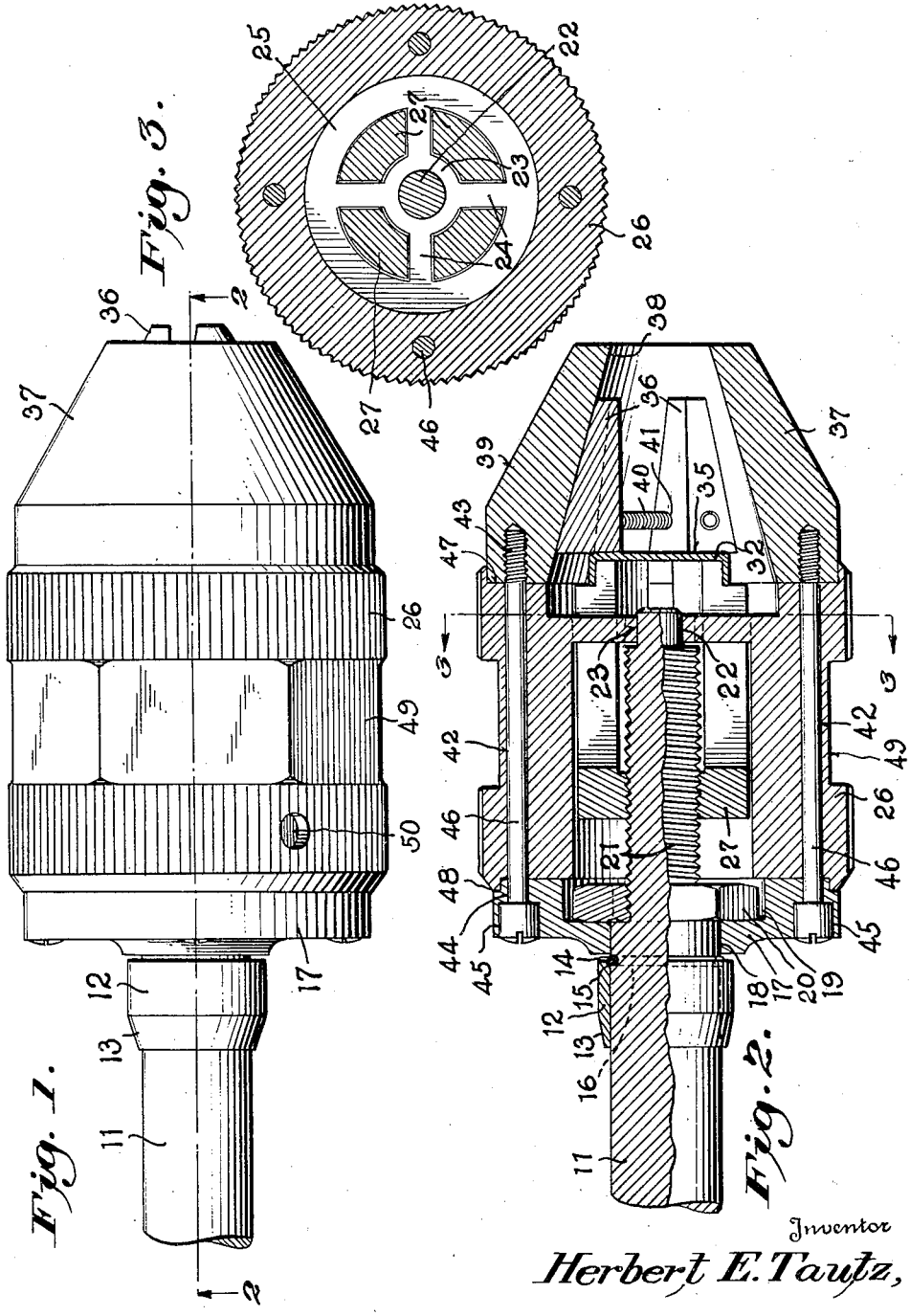
Inventor
Herbert E. Tautz,
By Carl A. Hellmann,
Attorney.

Oct. 10, 1933. H. E. TAUTZ 1,930,022
CHUCK
Filed May 21, 1932 2 Sheets-Sheet 2
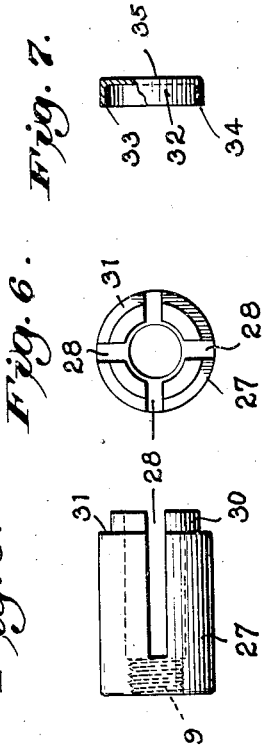
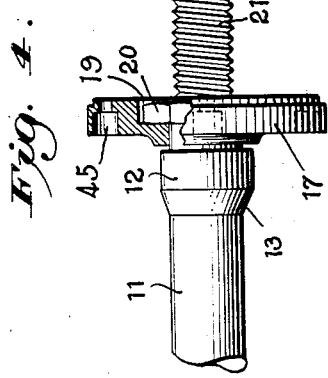
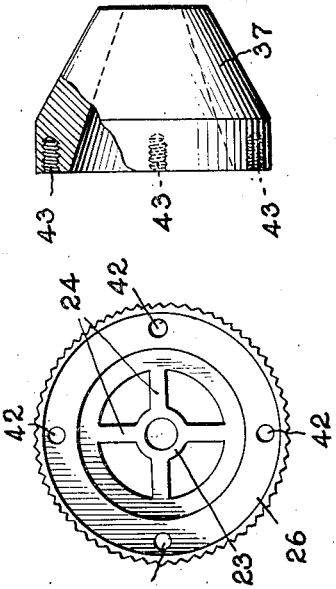
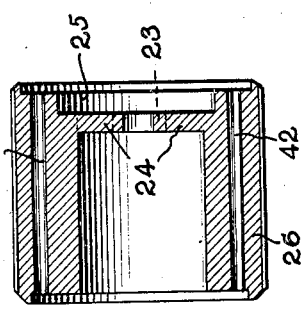
Inventor
Herbert E. Tautz,
By Carl A. Hellmann,
Attorney.

Patented Oct. 10, 1933

1,930,022

UNITED STATES PATENT OFFICE 1,930,022

CHUCK

Herbert E. Tautz, Milwaukee, Wis., assignor to Delta Manufacturing Company, Milwaukee, Wis.

Application May 21, 1932. Serial No. 612,787

9 Claims. (Cl. 279—58)

This invention relates to chucks having jaws arranged to slide in a casing, said chuck being provided with a spindle for supplying power thereto, the spindle being also arranged in such manner that the jaws may be operated by rotating the chuck about the axis of the spindle.

Heretofore, chucks have already been provided with spindles having screw-threaded ends engaging in cooperating screw-threads provided in the chuck, said chuck thereby being rotatable upon said threads, whereby, at the same time, it moves axially of the spindle. This relative axial movement of the chuck and the spindle has formerly been applied to position the jaws, that is, to advance or retract them with respect to the jaw-holding end of the chuck. In chucks of this nature, however, upon the occurrence of any looseness, due to inaccuracy of workmanship or to wear, the alinement of the spindle with the axis of the chuck is inevitably disturbed, and inasmuch as the jaws are actuated directly by the end of the shaft or spindle, which bears against them, either directly or indirectly, any such inaccuracy of fit between the threads on the spindle and those in the chuck will cause inaccurate movement of the chuck jaws and the chuck will thus become out of center. This defect will, of course, be accentuated by wear, so that chucks of this type are very difficult to make accurate, even when new, and will soon deteriorate in accuracy even when used with reasonable care. However, chucks of this type are very easily and cheaply made, and therefore, one object of the present invention is to retain, as far as possible, the desirable features of ease of manufacture and low cost inherent in spindle-operated chucks, while, at the same time, eliminating the defects of this type of chuck.

This is accomplished, in the case of the present invention, by eliminating direct contact between the screw-threaded spindle and the jaws of the chuck, and providing an intermediate member which is movable only longitudinally of the chuck, said member cooperating, on the one hand, with the jaws to advance and retract the same and cooperating, on the other hand, with screw-threads on the end of the spindle, in order to move said member axially of the chuck.

In order to prevent inaccuracy of alinement between the said shaft and the body of the chuck, said shaft is guided in at least two bearings within the said chuck, namely, one where the spindle enters the chuck and another spaced therefrom and located preferably as near as possible to the nose or jaw end of the chuck. By thus pivotally supporting the shaft at two relatively spaced points, and by employing cylindrical journals and bearings, instead of having the screw-threads on the shaft turning directly in a correspondingly screw-threaded portion of the chuck, several advantages are gained, namely, first, the screw-threads are not subjected to excessive wear or strains, and serve merely to advance or retract the jaws; second, due to the fact that two spaced cylindrical bearings are employed, the accuracy of alinement of the shaft does not deteriorate readily, and, third, due to the fact that the screw-threads on the end of the shaft do not engage screw-threads in the body of the chuck, the chuck will not move axially as an entirety on said spindle when loosened or tightened by rotation thereon, which, in some cases, is a very annoying feature of the type of chuck wherein the screw-threads on the spindle are engaged directly by the body of the chuck.

A further object of the invention is to provide a chuck wherein expensive machine work is eliminated as far as possible, and wherein the number of screw-threaded parts is reduced to a minimum.

Another object is to provide a chuck structure wherein certain parts may be cheaply made, as, for example, by plastic molding, die-casting, or other relatively inexpensive processes.

Other objects and advantages of my invention will, in part, be specifically explained in the following specification and accompanying drawings, and will, in part, also be obvious upon inspection thereof.

In said drawings, which illustrate one form of my invention:

Fig. 1 is a side view of a chuck embodying my invention.

Fig. 2 is a view of the chuck in central longitudinal section, partly in elevation, said section being made on the line 2—2 of Fig. 1.

Fig. 3 is a cross section of the chuck on the plane indicated by the line 3—3 of Fig. 2.

Fig. 4 is a partly sectional detail showing the end of the spindle and the end plate of the chuck which serves as one bearing for the said spindle.

Fig. 5 is a side view of a slotted tubular member which cooperates with the threaded end of the spindle, and Fig. 6 is an end view of the same as seen from the right hand end of Fig. 5.

Fig. 7 is a cap which fits over said right hand end of the slotted member of Fig. 5.

Fig. 8 is a side view, partly in central longitudinal section, of the main or body member of the chuck, and Fig. 9 is an end view of said body member, as seen when looking at Fig. 8 from the right.

Fig. 10 is the jaw-guiding end member of the chuck.

Considering the details of the invention, upon referring to Fig. 1 it will be noted that I provide a spindle 11, which may be the actuating spindle of the chuck, for example, a spindle of a drill press, lathe, milling machine, etc., said shaft or spindle 11 having a tubular member 12 arranged thereon, said member 12 having a bearing zone 13 adapted to cooperate with any suitable ball or other bearings, not shown, said sleeve 12 being retained against moving axially of the shaft by any suitable means, for example a split ring 14, seated in annular grooves 15 and 16 in the sleeve and shaft respectively. These details form no part of the present invention, may be modified in many ways, and are stated here only for the sake of completeness.

The end plate 17 of the chuck is bored at 18 to form a bearing for the shaft 11. This end plate is counterbored as shown at 19 to receive a nut 20, which engages screw-threads 21 upon the inner end of the shaft 11, which is preferably slightly reduced in diameter, as shown in Figs. 2 and 4. In the present case it is advantageous to make the screw-threads 21 left-handed, as illustrated. At its extreme end, the shaft 11 has a reduced journal portion 22, which serves as the inner guide for the same. This reduced end 22 is pivotally supported in a suitable bearing 23, shown in Figs. 2, 3, 8 and 9, which, as best shown in Fig. 2, is spaced a considerable distance from the end plate 17. The bearing 23 may be supported by a suitable number of radial arms 24, shown in Figs. 3 and 9, and forming, with the outer ring 25, a substantially spider-shaped structure. This spider may be a separate member, in certain cases, or may equally well be formed integral with the body member 26 of the chuck, depending upon ease of manufacture and other governing conditions.

It will be noted that by this structure of the spider, whether it is made as an independent member or as an integral part of the body 26, a plurality of apertures, each of which is substantially an annular sector, is formed, said sectors being bounded by the ribs 24 and the annular surfaces of 23 and 25, respectively. The outer surface of the body portion 26 is preferably knurled or otherwise roughened as indicated, although it is obvious that any other configuration of said surface could also be used, for example, "flats" or facets 49 may be also provided thereon to cooperate with a wrench or the like for ease in tightening or loosening the chuck, or any other means for gripping the same readily either by hand or by a suitable tool may be provided, for example, holes 50, for use with a spanner.

Referring now to Figs. 5 and 6, there is shown a tubular slotted member or nut 27, which, in the present case, is provided with two diametral slots 28 at right angles to one another, said slots thus dividing the tube into four prongs, and extending to within a relatively short distance of one end of the tube, namely, the left hand end in Fig. 5. This portion of the tube or tubular nut is internally threaded as shown at 29, said threads 29 corresponding to the threads 21 on the shaft 11, and, therefore, in the present case being also left-handed threads. At the other end of the nut or tubular member, the external diameter is reduced slightly, as shown at 30, so as to produce a plane shoulder at 31.

A cap 32, shown in Figs. 2 and 7, has its inner or hollow portion of a suitable diameter at 33 to just slip over the reduced portion 30 of the tube 27, and be retained thereon frictionally, and the end or edge surface 34 of said cap will abut against the surface 31 of the said tubular member 27. The outer or flat surface 35 of the said cap will abut against the inner ends of the jaws 36, three such jaws being used in the preferred embodiment illustrated.

Said jaws are retained in proper position within a nose piece or jaw-guiding member 37, which forms the outer or free end of the chuck. This member 37 has a substantially frusto-conical bore 38 therein, and may itself be bounded externally by a frusto-conical surface 39, or in any other desired manner. The jaws 36 are urged apart from one another by compression springs 40, seated in apertures 41, in each jaw, so that the said jaws will be automatically retracted by said springs until their inner ends abut against the outer end surface 35 of the cap 32, in all the positions of said cap.

The chuck is assembled with the body 26 arranged between the end plate 17 and the jaw-guiding member 37, as best shown in Figs. 1 and 2. This is conveniently and inexpensively accomplished as follows: The body 26 is provided with a plurality of bores 42, the jaw-guiding member is provided with a corresponding number of internally threaded holes 43 and the end plate 17 also has a corresponding number of bores 44, each of which is counterbored suitably, as shown at 45. A screw 46 of sufficient length to have its head received in the counterbore 45 and to have its threaded end screwed into the tapped hole 43, is provided in each of said sets of bores, whereby the members of the chuck may be suitably held together by merely securing said screws in position. In this way, by merely providing plane surfaces at the contacting ends of the chief elements of the chuck, which surfaces are in planes at right angles to the axis, perfect alinement is attainable without making use of any expensive, large-diameter, thread portions, such as are customarily used in devices of this nature.

In order to properly position and seat the parts of the chuck with respect to one another, the body 26 may be counter-bored at its respective ends as at 47 and 48 to receive the abutting ends of the jaw-guiding member 37 and the end plate 17, respectively.

In operation, it will be noted that upon rotating the shaft 11 in its bearings at 18 and 23, said shaft will not move axially with respect to the chuck, because, in the first place, there is no screw-threaded engagement between the chuck and the shaft, and, in the second place, axial movement is prevented by the nut 20, on the one hand, and by the reduced portion 22 of the shaft 11, on the other hand. However, upon rotating the shaft 11 with respect to the chuck, the tubular member or nut 27, which is in engagement with the screw-threads 21, will, of course, move axially forward or backward, inasmuch as said member is prevented from rotating, by reason of the fact that the prongs thereof pass between the ribs 24 which are immovable with respect to the body 26 of the chuck. Thereupon the cap 32, which covers the outer ends of said prongs, will, of course, also be moved axially inward or outward, and the jaws 36 will follow its movements, due to the expansive efforts of their springs 40.

The ultimate result, therefore, produced by relative rotation of the chuck, with respect to this shaft, is that the jaws 36 will be advanced or retracted, and, therefore, due to the conical inner surface 38 of the member 37, will be opened or closed correspondingly.

While I have herein described what I now believe to be the preferred form of my invention, it will, of course, be obvious that various changes, additions, or omissions may be made therein without departing from the spirit of the invention. The various parts of the chuck may be made of any usual or suitable materials, and certain portions thereof, for instance, end plate 17 and body member 26 in particular, which are not subjected to any great strains in service, may, as stated, be made as die-castings or molded of synthetic resins, or the like, to eliminate much or all of the machine work which would otherwise be necessary. It will be noted that, aside from the holding screws 46, which are relatively inexpensive, and the cooperating tapped holes 43, the only threads involved in the chuck are the threads 21 and the threads 29 cooperating therewith, as well as the threads in the nut 20.

These threads are all of relatively small diameter with reference to the length of the threaded portion, and may be readily and inexpensively made by ordinary taps and dies. In other words, threads of this nature do not require cutting by means of a lathe or similar mechanism, which is a relatively expensive operation. It will be noted, moreover, that the accuracy of operation of the chuck jaws, and the accuracy of alinement of the chuck as a whole, do not in any way depend upon the accuracy of the threads 21 or 29, which serve merely to impart axial movement to the tubular sleeve 27, which is separately alined by means of the ribs or arms 24 of the spider-like structure. Furthermore, due to the relatively great distance between the bearings 18 and 23, the chuck is remarkably free from lost motion or lack of axial alinement and even after long continued use and comparatively careless handling will still maintain a high degree of accuracy.

Having thus described an embodiment of my invention and explained some of the advantages thereof, I claim:

1. A chuck comprising a set of loosely arranged jaws, a spindle, an end plate having a bore forming a bearing for said spindle, a body member, a nose piece having a substantially frusto-conical outer surface and a substantially frusto-conical bore, said jaws being enclosed within the bore and guided by said nose piece, said end plate and body member being provided with a plurality of bores and said nose piece having threaded holes therein, corresponding bores in the end plate and body member being alined with said threaded holes when the said end plate, body member and nose piece are assembled, and screws passing through said bores and into the threaded holes to secure the whole rigidly together.

2. A chuck having a body member, an end plate at one end thereof and a jaw-guiding member at the other, said end plate having a central bore, a spindle entering said body member and journaled in said bore, there being a cylindrical portion at the end of the spindle, a bearing for said cylindrical portion being formed in the body member, threads on that portion of said spindle which is within the body member, a slotted cylindrical nut engaging said threads and having an end projecting axially beyond the threaded portion of the spindle, means stationary with respect to the body member, engaging in a slot of said nut, whereby rotation of the nut with respect to the body member is prevented and whereby rotation of the spindle will produce only longitudinal movement of the said nut, means for preventing longitudinal movement of the spindle, jaws located within the jaw guiding member, means tending to cause said jaws to separate from one another, said jaws being arranged so that their inner ends are adjacent the said projecting end of the nut, whereby the longitudinal movement of said nut will cause the jaws to be correspondingly longitudinally moved.

3. A chuck comprising a set of loosely arranged jaws, a solid elongated rod forming a spindle, an end plate having a smooth bore forming a bearing for said spindle, a body member, and a nose piece having a substantially frusto-conical bore, said jaws being enclosed within the bore and guided by said nose piece, means separate from said end plate, body member and nose piece whereby they are rigidly secured together, said spindle having a threaded portion thereon within the chuck, and a smooth portion beyond said threaded portion, the body member being provided with a bearing to receive the said smooth portion, whereby said spindle is thus supported rotatably in the chuck at two spaced points to provide accurate alinement of the said spindle with respect to the chuck and threaded means engaged with the threaded portion of the spindle and with the jaws, bearing against the inner ends of said jaws to actuate them within the conical bore of the nose piece.

4. A chuck comprising a set of loosely arranged jaws, a spindle, an end plate having a smooth bore forming a bearing for said spindle, a body member, and a nose piece having a substantially frusto-conical outer surface and a substantially frusto-conical bore, said jaws being enclosed within the bore and guided by said nose piece, means separate from said end plate, body member and nose piece whereby they are rigidly secured together, said spindle having a threaded portion thereon within the chuck, and a smooth portion beyond said threaded portion, the body member being provided with a bearing to receive the said smooth portion, whereby said spindle is thus supported rotatably in the chuck at two spaced points to provide accurate alinement of the said spindle with respect to the chuck, a screw-threaded, longitudinally slotted, tubular member arranged on the threaded portion of the spindle, said body member being also provided with a bore to receive said tubular member, and with at least one internal substantially radial projection extending into the said bore, in alinement with a slot of the tubular member, thus preventing the said tubular member from rotating with respect to the body but offering no obstacle to longitudinal movement thereof, a plurality of jaws arranged in, and guided by, the nose piece, and means having a substantially plane end upon the outer end of said tubular member whereby said tubular member controls said jaws when thus longitudinally moved.

5. A chuck comprising an enclosing casing, having two spaced bearings therein, a spindle rotatably mounted in said bearings, said spindle having a threaded portion between said bearings, a slotted tubular nut mounted on said threaded portion and having a portion projecting axially beyond said thread portion, guide means in said casing engaging the slotted portion of the nut to prevent rotation thereof, a plurality of jaws mounted in said casing and means whereby the said nut will actuate said jaws.

6. A chuck comprising an enclosing casing, having two spaced bearings therein, a spindle rotatably mounted in said bearings, said spindle having a threaded portion between said bearings, a slotted tubular nut mounted on said threaded portion, and having a portion projecting axially beyond said threaded portion, guide means in said casing engaging the slotted portion of the nut to prevent rotation thereof, a plurality of jaws mounted in said casing, means for retracting said jaws, and a cap mounted on the tubular nut and engaging the inner ends of the jaws, whereby said cap and nut will actuate the jaws upon rotation of the spindle.

7. A chuck comprising an enclosing casing having two spaced bearings therein, a spindle rotatably mounted in said bearings, said spindle having a threaded portion between said bearings, a slotted tubular nut mounted on said threaded portion and having a greater axial length than said threaded portion, means secured to the casing and engaging in a slot of said nut to prevent rotation of the nut with respect to the casing, jaws mounted in said casing, means mounted upon the tubular nut beyond the end of the spindle and engaging the inner ends of the said jaws, a portion of the enclosing casing of the chuck having a frusto-conical bore in engagement with the outer surfaces of the jaws and means normally urging the jaws of the chuck to separate from one another, whereby the spindle, upon rotating in one direction with respect to the nut, will force the jaws to approach one another whereas rotation of said spindle in the opposite direction will relieve said force and permit the jaw-separating means to retract said jaws.

8. A chuck comprising a set of loosely arranged jaws, a spindle, an end plate having a bore forming a bearing for said spindle, a body member, a nose piece having a substantially frusto-conical outer surface and a substantially frusto-conical bore, said jaws being enclosed within the bore and guided by said nose piece, said end plate and body member being provided with a plurality of bores and said nose piece having threaded holes therein, corresponding bores in the end plate and body member being alined with said threaded holes when the said end plate, body member and nose piece are assembled, and screws passing through said bores and into the threaded holes to secure the whole rigidly together, said body member being made of softer material than the nose piece.

9. A chuck comprising a set of loosely arranged jaws, a spindle, an end plate having a bore forming a bearing for said spindle, a body member, a nose piece having a substantially frusto-conical outer surface and a substantially frusto-conical bore, said jaws being enclosed within the bore and guided by said nose piece, said end plate and body member being provided with a plurality of bores and said nose piece having threaded holes therein, corresponding bores in the end plate and body member being alined with said threaded holes when the said end plate, body member and nose piece are assembled, and screws passing through said bores and into the threaded holes to secure the whole rigidly together, said body member being made of an artificial resin product.

HERBERT E. TAUTZ.